United States Patent
Hasebe

(10) Patent No.: US 6,611,392 B1
(45) Date of Patent: Aug. 26, 2003

(54) MAGNETIC DISK DEVICE AND RETRY METHOD FOR A MAGNETIC DISK DEVICE

(75) Inventor: Yoshihiro Hasebe, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/434,479

(22) Filed: Nov. 5, 1999

(30) Foreign Application Priority Data

Nov. 5, 1998 (JP) ............................................ 10/314478

(51) Int. Cl.$^7$ .................................................. G11B 5/09
(52) U.S. Cl. ............................................ 360/53; 714/5
(58) Field of Search ........................... 360/53, 25, 31; 369/53.15, 53.42, 30.32, 30.36; 711/100; 714/42, 43, 48, 54, 56, 5, 6; G11B 20/18

(56) References Cited

U.S. PATENT DOCUMENTS 5,872,905 A * 2/1999 Ono et al. ...................... 714/5
6,118,608 A * 9/2000 Kakihara et al. ............. 360/53

FOREIGN PATENT DOCUMENTS

| JP | 4-368673 | 12/1992 | | |
|---|---|---|---|---|
| JP | 8-95717 | 4/1996 | | |
| JP | 10161818 A | * 6/1998 | ............. | G06F/3/06 |
| JP | 2000148410 A | * 5/2000 | ............. | G06F/3/06 |
| JP | 2000163707 A | * 6/2000 | ............. | G11B/5/09 |

* cited by examiner

Primary Examiner—David Hudspeth
Assistant Examiner—Dan I. Davidson
(74) Attorney, Agent, or Firm—Foley & Lardner

(57) ABSTRACT

For the purpose of suppressing interruptions in data transfer to a minimum and carrying out optimum retry processing, the magnetic disk device of this invention includes: interface control means 1 for storing commands that have been received from a host computer in command queue 2; interface load detecting means 3 for detecting the interface load based on the total number of commands stored in command queue 2; load level conversion table 10 that takes the number of commands stored in command queue 2 as the index value; retry table 9 for storing contents of retry processing that correspond to each load level; and command executing means 4 for sequential fetching and executing of commands from command queue 2 and, when a retry is necessary, for obtaining from retry table 9 a content of retry processing that corresponds to the load level detected by interface load detecting means 3 and executing retry processing.

8 Claims, 5 Drawing Sheets

| NUMBER OF COMMAND | LOAD LEVEL VALUE |
|---|---|
| 0 | 0 |
| 1 | 1 |
| 2 | 2 |
| 3 | 2 |
| 4 | 3 |
| 5 | 3 |
| ⋮ | ⋮ |

10 LOAD LEVEL CONVERSION TABLE

Fig. 2
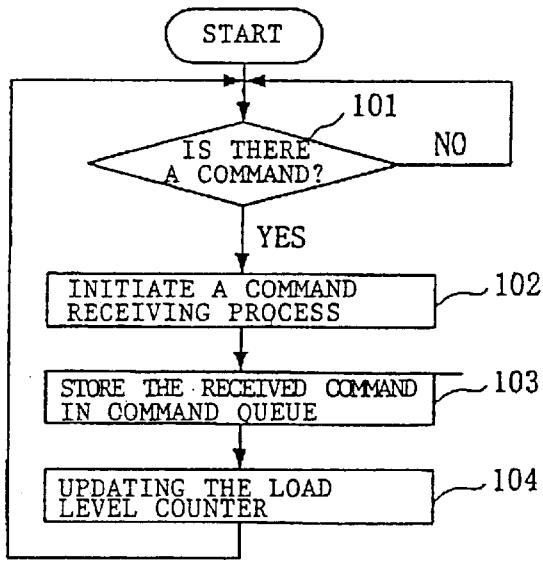
Fig. 5
NUMBER OF COMMAND | LOAD LEVEL VALUE
10 LOAD LEVEL CONVERSION TABLE
| Number of Command | Load Level Value |
|---|---|
| 0 | 0 |
| 1 | 1 |
| 2 | 2 |
| 3 | 2 |
| 4 | 3 |
| 5 | 3 |
| ⋮ | ⋮ |
Fig. 6
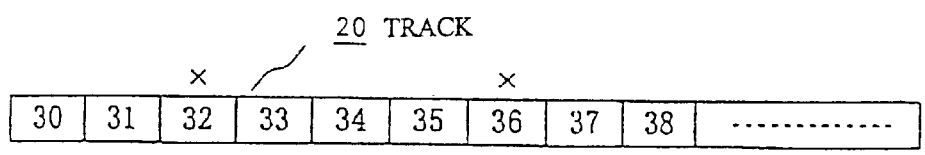

Fig. 4

9 RETRY TABLE

| VALUE OF LOAD LEVEL COUNTER | CONTENTS OF RETRY | | | | | | | |
|---|---|---|---|---|---|---|---|---|
| | 1 RETRY | 2 RETRY | 3 RETRY | 4 RETRY | 5 RETRY | 6 RETRY | 7 RETRY | 8 RETRY |
| 0 | 7 SIMPLE RETRY | OFFSET +1 | OFFSET -1 | OFFSET +2 | OFFSET -2 | OFFSET +3 | OFFSET -3 | END |
| 1 | 3 SIMPLE RETRY | OFFSET +1 | OFFSET -1 | OFFSET +2 | OFFSET -2 | END | END | END |
| 2 | 1 SIMPLE RETRY | OFFSET +1 | OFFSET -1 | END | END | END | END | END |
| 3 | 1 SIMPLE RETRY | END | | | | | | |
| ...... | ...... | ...... | ...... | ...... | ...... | ...... | ...... | ...... |

MAGNETIC DISK DEVICE AND RETRY METHOD FOR A MAGNETIC DISK DEVICE

BACKGROUND OF THE INVENTION

1. Field of the Invention

The present invention relates to a magnetic disk device, and particularly to a magnetic disk device and a retry method for a magnetic disk device that changes the content of retry processing according to the access state of commands from a host device.

2. Description of the Related Art

In the prior art, a magnetic disk device reads or records with respect to a series of sectors on a magnetic medium upon receiving a read/write command from a host computer. However, when the magnetic disk device encounters sectors that, for whatever reason, cannot be read from or recorded to, it again attempts to read from or record to the sector in which the error occurred.

Regarding the method of retry, the magnetic disk device, for example, reads from or records to the sector in which an error occurred a stipulated limited number of times, and if reading or recording is successful within this number of times, the magnetic disk device regards this as normal reading or recording and continues reading from or recording to the next sector.

As another retry method, the magnetic disk device does not merely read from or record to a sector in which an error has occurred, but adds another process. For example, when reading, the magnetic disk device reads again after slightly shifting the position of the head in a direction toward or away from the disk center. Alternatively, the magnetic disk device retries reading while, for example, changing the gain of the amplifier that amplifies the output voltage of the head.

When actually executing a retry, the retry process of the magnetic disk device is executed by a particular set procedure, the series of retry operations being terminated when the retry is successful.

In the above-described retry method of the prior art, however, there is the problem that when executing the retry processing, the magnetic disk device fails to send the data requested by the host computer within a stipulated time period. A particularly short data transfer time is demanded of a magnetic disk device used in an active image processing system. In a retry method of the prior art, however, the initiation of the retry process interrupts the active image data transfer of the active image processing system, giving rise to disturbances or interruptions in the active image.

In the retry method of the prior art, a magnetic disk device can lighten the retry processing to prevent interruptions in data transfer. However, the magnetic disk device in such a case must lighten the retry processing in all cases, and therefore may fail to execute sufficient retry processing even when there is plenty of time for it, thereby increasing the frequency of error generation. Magnetic disk devices used in active image processing systems therefore cause disturbances in the active image.

SUMMARY OF THE INVENTION

It is an object of the present invention to provide a magnetic disk device and a magnetic disk device retry method that can suppress interruptions in data transfer to a minimum and that allows the most effective retry processing within the range that suppresses interruptions to a minimum so as to solve the above-described problems.

It is another object of the present invention to provide a magnetic disk device and a magnetic disk device retry method that suppresses drops in the throughput of the magnetic disk device and prevents the occurrence of errors or interruptions in data transfer.

The magnetic disk device of the present invention comprises: a driving means (5) that includes a magnetic disk-shaped medium and that drives the magnetic disk-shaped medium-shaped medium; reading/writing means (7) that includes error detecting means (8) and that reads or writes data; positioning means (6) for determining the position of the reading/writing means on the magnetic disk; interface control means (1) for communicating with the host computer; command queue (2) for storing commands received in the interface control means; load detecting means (3) for detecting the load of interface with the host computer based on the total number of commands stored in the command queue; load level conversion table (10) that takes the number of commands stored in the command queue as the-index value; retry table (9) for storing in advance contents of retry processing that correspond to the load levels of the load detecting means; and executing means (4) for fetching and executing commands from the command queue, and when retry is necessary, for obtaining the content of retry processing that corresponds to a load level detected by the load detecting means and executing the retry process.

The magnetic disk device of the present invention thus takes the total number of commands stored in the command queue as the load level of the interface with the host computer. When a retry is necessary, the magnetic disk device thus obtains from the retry table the content of retry processing that corresponds to the load level detected by the load detecting means and executes retry processing.

In addition, the retry table (9) is produced while establishing a correspondence between interface loads and contents of retry processing such that heavy retry processing is performed when the interface load is light and light retry processing is performed when the interface load is heavy. The magnetic disk device of the present invention performs heavy retry processing when there are few queued commands and light retry processing when there are many commands using a correlation in which the demand for data transfer processing increases in proportion to the number of commands previously issued from the host computer (the number of queued commands), and thus always selects the optimum retry processing for the load from the host computer.

The executing means (4) refers to the retry table each time retry is carried out with respect to a same sector on the medium and obtains from the retry table a content of retry processing that corresponds to the load level at that time.

According to the retry method of the present invention, the magnetic disk device: receives commands from the host computer by the interface control means; stores the commands received by the interface control means in the command queue; detects the load of the interface with the host computer based on the total number of commands stored in the command queue; fetches and executes commands from the command queue and, when a retry is necessary, obtains from the retry table a content of retry processing that corresponds to the detected load level and executes retry processing.

In addition, interface loads and contents of retry processing are stored in the retry table with a correspondence such that heavy retry processing is performed when the above-described interface load is light and light retry processing is performed when the load is heavy.

Furthermore, the retry table is consulted each time a retry is executed with respect to the same sector on the medium, and a retry processing content that corresponds to the load level at that time is thus acquired from the retry table.

According to the present invention, when a retry is necessary, the magnetic disk device can reduce the amount of time spent for retry when the interface load is heavy by obtaining from the retry table a content of retry processing that corresponds to the detected load level and then executing the retry processing. As a result, a magnetic disk device that is used in an active image processing system can prevent interruptions in data transfer that interrupt and disrupt an active image.

In addition, the magnetic disk device can reduce the amount of time spent for a retry even in a case in which sectors in a plurality locations fail for one command because the magnetic disk device refers to the retry table and changes the content of retry processing each time an error occurs and retry becomes necessary.

The magnetic disk device can suppress interruptions in data transfer to a minimum and can execute the most effective retry processing within a limited time because interface loads and the contents of retry processing are stored in the retry table with a correspondence such that heavy retry processing is performed when the interface load is light and light retry processing is performed when the load is heavy.

Finally, the magnetic disk device can interrupt a retry when the load of interface increases and reduce the amount of time spent in a retry even during retry of the same sector because the magnetic disk device refers to the retry table and obtains from the retry table the content of retry processing that corresponds to the load level at that time each time retry is executed with respect to the same sector on the medium.

The above and other objects, features, and advantages of the present invention will become apparent from the following description based on the accompanying drawings which illustrate examples of preferred embodiments of the present invention.

BRIEF DESCRIPTION OF THE DRAWINGS

FIG. 2 is a flow chart for explaining the operation of the magnetic disk device of FIG. 1, and is a flow chart for the process of updating the register of an input command in a command queue;

FIG. 4 shows the configuration of the retry table of FIG. 1;

FIG. 5 shows the configuration of the load level conversion table of FIG. 1;

FIG. 6 shows the format of tracks on the medium of FIG. 1; and

DETAILED DESCRIPTION OF THE PREFERRED EMBODIMENTS

First Embodiment

Figure 1:
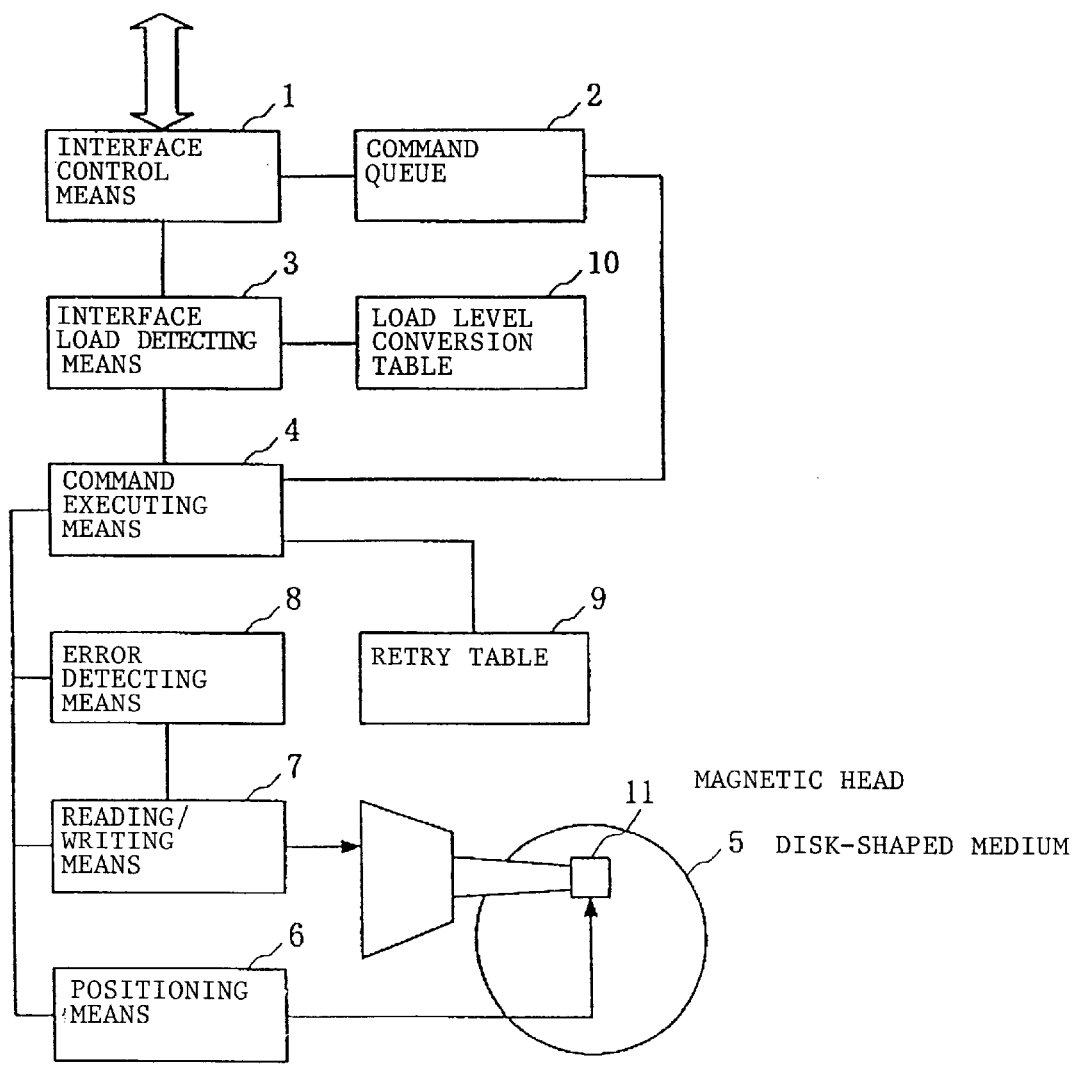
FIG. 1 is a block diagram showing the magnetic disk device according to the first embodiment of the present invention.
Figure 3:
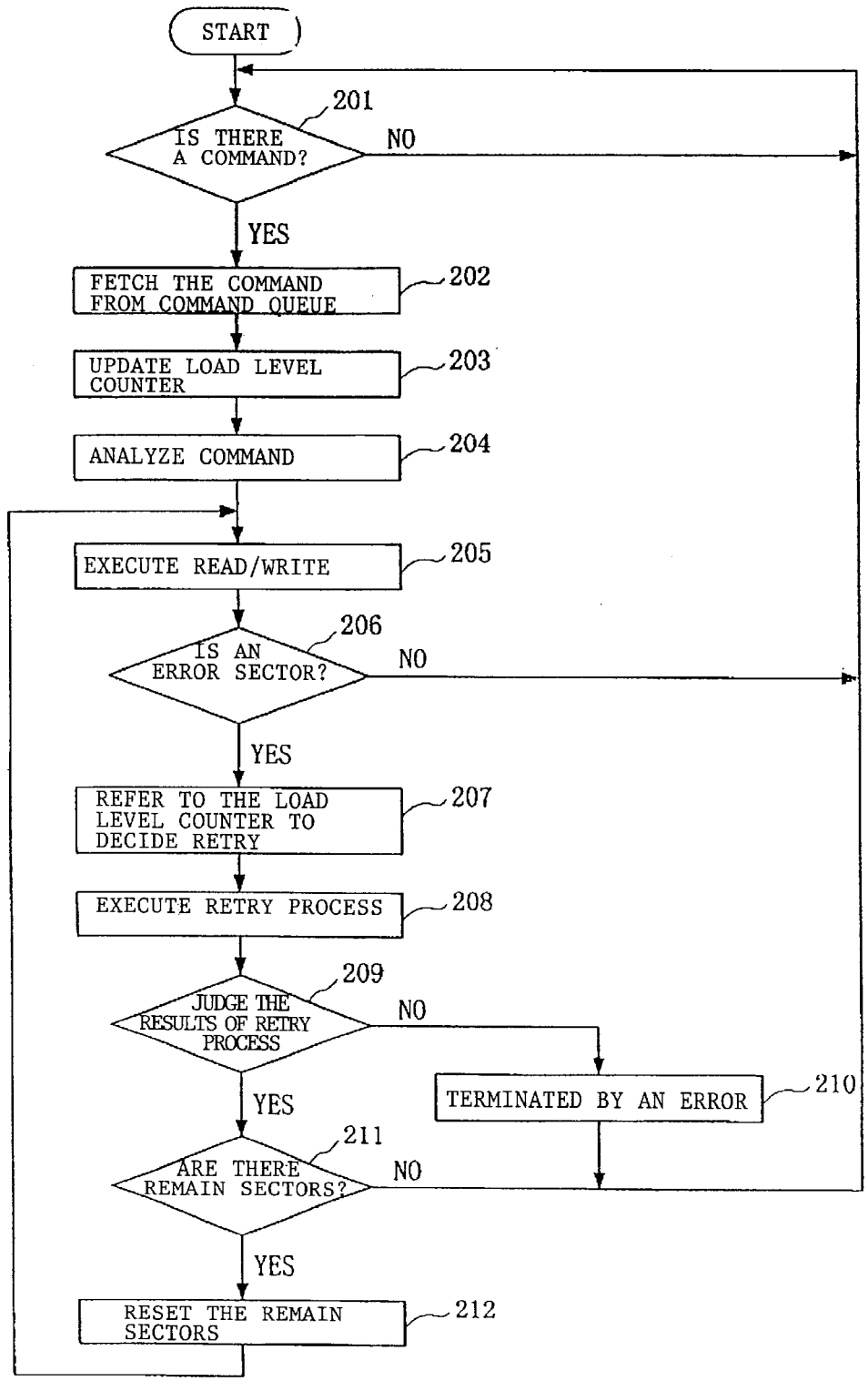
FIG. 3 is a flow chart for explaining the operation of the magnetic disk device of FIG. 1, and is a flow chart for the process of executing a command taken from the command queue.

The embodiments of the present invention are next explained in detail with reference to the accompanying figures. FIG. 1 is a block diagram showing the magnetic disk device according to the first embodiment of the present invention, and FIGS. 2 and 3 are flow charts for explaining the operation of the magnetic disk device of FIG. 1.

The magnetic disk device of this embodiment includes: interface control means 1 for receiving commands from, or for mutually transmitting data with, a host computer not shown in the figures; command queue 2 for temporarily storing commands received at interface control means 1; interface load detecting means 3 for detecting the load level of interface control means 1 based on the total number of commands stored in command queue 2; command executing means 4 for sequentially fetching commands stored in command queue 2 and giving instructions to reading/writing means 7 and positioning means 6 (described hereinbelow) in accordance with the content of these commands; disk-shaped medium (magnetic disk) 5 for storing data in sector units; positioning means 6 for positioning magnetic head 11 at sectors of medium 5 instructed by commands; reading/writing means 7 for reading from or writing to sectors instructed by commands after magnetic head 11 has been positioned; error detecting means 8 for detecting the occurrence of errors during reading or writing by reading/writing means 7; retry table 9 for describing the content of retry processing that corresponds with each load level; and load level conversion table 10 for storing the numbers of commands and the corresponding load level values.

Interface load detecting means 3 treats the total number of commands stored in command queue 2 as the interface load level, and each time interface control means 1 receives a command, interface load detecting means 3 refers to load level conversion table 10 and updates the load level value.

Command executing means 4 fetches and executes commands from command queue 2, and when a retry is necessary, obtains from retry table 9 the content of retry processing that corresponds with the detected load level and executes the retry processing.

Referring now to the flow charts of FIGS. 2 and 3, an explanation is presented regarding the overall operations of the magnetic disk device of this embodiment.

First, when a command is sent from the host computer (not shown in the figures) to interface control means 1, interface control means 1 detects that a command has been sent in (Step 101 of FIG. 2) and initiates a command receiving process (Step 102). Interface control means 1 then stores the received command in command queue 2 (Step 103).

The number of commands stored in command queue 2 can be considered as the level of demand for data transfer from the host computer to the magnetic disk device. The level of the interface load with the host computer can be considered to be equivalent to the number of commands present in command queue 2.

The effect of interruptions in data transfer due to retry processing increases in proportion to the load of the magnetic disk device.

A correspondence between the number of commands stored in command queue 2 and the level of retry processing that does not bring about interruptions in data transfer is stored in a table as the retry table. The retry table is preferably consulted based on the number of commands stored in command queue 2 such that the retry method is optimized each time retry processing is executed.

In other words, interface control means 1 counts the number of commands stored in command queue 2 when it is detected that a command has been stored in command queue 2. Interface load detecting means 3 then refers to load level conversion table 10 using this count value as the index value.

Load level conversion table 10 is a table that stores the numbers of commands and corresponding load level values.

Interface load detecting means 3 refers to load level conversion table 10 using the number of commands stored in command queue 2 as the index value and obtains the load level value that corresponds to this number of commands. Interface load detecting means 3 then updates its own load level counter (not shown in the figure) according to the obtained load level value (Step 104).

The value of the load level counter is set to "0" at the time of initialization. When updating of the load level counter is completed, the process returns to Step 101, and interface control means 1 and interface load detecting means 3 move to a standby state for receiving commands from the host computer.

The above-described sequence of procedures is activated each time a command is sent from the host computer, and the command is thus added to command queue 2 and the load level counter updated.

Upon detecting that a command has been; stored in command queue 2 (Step 201 in FIG. 3), command executing means 4 fetches the command from command queue 2 (Step 202).

The number of commands stored in command queue 2 decreases when a command is fetched from command queue 2. Interface load detecting means 3 therefore refers again to load level conversion table 10 using the number of commands stored in command queue 2 as the index value, obtains a new load level value corresponding to this number of commands, and updates its own load level counter according to this load level value (Step 203).

Command executing means 4 next analyzes the command that was fetched from command queue 2 (Step 204). Command executing means then gives instructions to positioning means 6 and reading/writing,means 7 according to the content of the analyzed command.

Positioning means 6 accordingly positions head 11 at the sector of medium 5 instructed by the above-described command, and reading/writing means 7 executes reading from or writing to that sector (Step 205).

Error detecting means 8 detects errors that occur at the time of reading or writing. After execution of reading from or writing to medium 5, command executing means 4 checks whether or not the process ended in an error based on the detection results of error detecting means 8 (Step 206).

Command executing means 4 then returns to Step 201 if the process was completed as normal, and moves on to Step 207 to begin retry processing if the process ended in an error.

In Step 207, command executing means 4 refers to retry table 9 using the value of the load level counter as the index value to carry out the first retry.

FIG. 4 shows the configuration of retry table 9. Contents of retry processing are stored in retry table 9 corresponding to values of the load level counter. Each row of retry table 9 in FIG. 4 is the contents of retry processing that correspond to load level counter values, the retry processes being arranged in order from the left in each row as the first retry processing, the second retry processing, the third retry processing, and so on.

For example, the content of retry processing that corresponds to a load level counter value of "1" is described in the order of retries as follows: "3 simple retries"; "offset +1"; "offset −1"; "offset +2"; and "offset −2".

Here, "3 simple retries" indicates that three retries should be carried out with respect to the sector in which an error occurred. "Offset +1" indicates that an offset seek is to be performed in which head 11 is shifted one unit of distance in the radial direction of medium 5, following which one retry is to be carried out with respect to the sector in which an error occurred. "Offset −1" has a similar meaning, but in this case, the movement of head 11 during the offset seek is in the direction opposite that of "offset +1".

In the same way, "offset +2" indicates that an offset seek is to be performed by moving head 11 two units of distance in the radial direction of medium 5 following which one retry is to be carried out with respect to the sector in which an error occurred. "Offset −2" has a similar meaning, but in this case, the movement of head 11 during the offset seek is in the direction opposite that of "offset +2".

The term "end" used in retry table 9 indicates the termination of retry processing that corresponds to each load level counter value. This information indicating termination of retry processing is recorded because the content of retry processing that corresponds to each load level counter value is of variable length.

Information indicating the termination of retry processing is also similarly set for undefined items of the retry processing content.

As can be understood from FIG. 4, the retry processing described in retry table 9 becomes lighter (i.e., processing reaches termination after fewer retries) as the value of the corresponding load level counter value increases.

For example, the retry processing that corresponds to a load level counter value of "1" reaches termination on the sixth retry, while the retry processing that corresponds to a load level counter value of "2" reaches termination on the fourth retry.

Command executing means 4 next gives instructions to positioning means 6 and reading/writing means 7 in accordance with the content of retry processing obtained from retry table 9 and then executes retry processing (Step 208).

When the load level counter value is "1", for example, command executing means 4 carries out three retries (reading or writing) with respect to the sector in which an error occurred as the initial retry processing. The operations of positioning means 6 and reading/writing means 7 in this case are the same as described hereinabove.

If, after executing this retry processing, command executing means 4 determines from the detection results of error detecting means 8 that an error occurred and the retry failed, it performs, as the second retry processing, one retry with respect to the sector in which errors occurred after an offset seek of one unit of distance.

Positioning means 6 positions head 11 at the sector in which errors occurred after moving head 11 one unit of distance in the radial direction of medium 5, and reading/writing means 7 then executes reading or writing with respect to the sector.

Retry processing subsequently continues in the same way through the sequential processes of "offset −1", "offset +2", "offset −2" until a retry is successful.

Command executing means 4 terminates the retries if a retry is successful during sequential execution of the retry processing.

Command executing means 4 also terminates retries upon reaching the information indicating termination of the retry processing if no success results from the sequential execution of the retry processing described in retry table 9.

After termination of retries, command executing means 4 judges the results of performing the retry (Step 209). If it is determined that retry was successful, command executing means 4 next determines whether or not there remain sectors for which reading or writing has been designated by the command fetched from command queue 2 (Step 211).

If there are no remaining sectors, command executing means 4 returns to Step 201 and moves to the sequence of fetching the next command. If there are remaining sectors, command executing means 4 returns to Step 205 to carry out reading or writing with respect to the remaining sectors.

If command executing means 4 determines that retry failed in Step 209 (if retry processing is terminated in accordance with the information indicating termination described in retry table 9), command executing means 4 reports to the host computer that the execution of the command was terminated by errors (Step 210), returns to Step 201, and moves on to the sequence of fetching the next command.

The operation of the magnetic disk device of this embodiment is next explained using a more concrete example. FIG. 5 shows the configuration of load level conversion table 10 of FIG. 1.

Load level conversion table 10 is a table for converting to load level values using the number of commands stored in command queue 2 as the index value.

For example, the load level value is "0" if the number of commands is "0", and the load level value is "1" if the number of commands is "1".

FIG. 6 shows the format of track 20 on medium 5. Of sectors 30, 31, 32 . . . of track 20, sectors 32 and 36 are error sectors that can be recovered by retry.

It is then assumed that no commands are registered in command queue 2 at the start time.

When a command is sent from a host computer (not shown in the figure) to interface control means 1, interface control means 1 detects that a command has been sent in (Step 101 in FIG. 2) and begins a command receiving process (Step 102). It is assumed that the command in this case is a command instructing that data be read from sector 30 to sector 36 on track 20 of FIG. 6.

Interface control means 1 then stores the received command in command queue 2 (Step 103).

Because the number of commands stored in command queue 2 in this case is 1, interface load detecting means 3 refers to load level conversion table 10 using the number of commands (1) as the index value and obtains a load level value of "1". Interface load detecting means 3 thus updates the value of the load level counter to "1" (Step 104). When the command receiving process of Steps 102–104 is completed, the process returns to Step 101 in preparation for reception of the next command.

Upon detecting that a command has been stored in command queue 2 (Step 201 in FIG. 3), command executing means 4 fetches the command from command queue 2 (Step 202), whereby the number of commands stored in command queue 2 becomes "0".

Interface load detecting means 3 therefore refers to load level conversion table 10 using the number of commands (0) as the index value and obtains a load level value of "0", and interface load detecting means 3 therefore updates the value of the load level counter to "0" (Step 203).

Command executing means 4 next analyzes the command that was fetched from command queue 2 (Step 204). Command executing means 4 then instructs the reading of sector 30 to sector 36 of track 20 to positioning means 6 and reading/writing means 7 in accordance with the content of the analyzed command.

In accordance with this instruction, positioning means 6 positions head 11 at track 20 of medium 5, and reading/writing means 7 executes reading from sectors 30–36 (Step 205).

Since sector 32 on track 20 is an error sector, an error occurs at sector 32 after reading from sectors 30 and 31, and reading is terminated.

In the judgment of Step 206, command executing means 4 proceeds to Step 207 because the reading process of Step 205 ended in an error.

In Step 207, command executing means 4 refers to the load level counter to decide the content of the retry processing in the event of an error.

If no commands have been received during the series of processes from Step 201 to Step 206, the value of load level counter remains at "0" without being updated because the number of commands stored in command queue 2 remains at "0".

If commands have been received, however, the load level counter is updated each time the sequence from Step 101 to Step 104 of FIG. 2 is followed.

If it is here assumed that two commands are received during the above-described series of processes from Step 201 to Step 206, the number of commands stored in command queue 2 becomes "1" with the reception of the first command, and since the load level value of load level conversion table 10 that corresponds to a command number of "1" is "1", the value of the load level counter is updated to "1". The value of the load level counter is similarly updated to "2" with the reception of the second command.

In Step 207, command executing means 4 refers to retry table 9 using the value of load level counter as the index value.

As described hereinabove, the value of the load level counter is updated to "2" if two commands are received during the series of processes from Step 201 to Step 206.

The content of retry processing corresponding to a load level counter value of "2" is described in retry table 9 of FIG. 4 as: "1 simple retry"; "offset +1"; and "offset −1".

Command executing means 4 then gives instructions to positioning means 6 and reading/writing means 7 in accordance with the content of the retry processing obtained from retry table 9 and executes the retry process (Step 208).

Command executing means 4 first performs one retry (reading) of error sector 32 as the first retry process.

If, after executing this retry process, command executing means 4 determines that an error occurred and the retry has failed, it then performs, as the second retry process, one retry with respect to error sector 32 following an offset seek of one unit of distance.

Command executing means 4 subsequently carries out sequential retry processing in the same way until a retry succeeds. If a retry is successful while carrying out sequential retries, command executing means 4 terminates the retry process at that point.

After completing the retry process, command executing means 4 judges the results of retry processing (Step 209). If the retry processing has been successful, command executing means 4 then determines whether or not there remain sectors for which reading or writing is to be continued (Step 211).

In this case, the reading of sectors 30 and 31 has been completed in accordance with a read command instructing reading from sector 30 to sector 36, and the reading of sector 32 has also been completed by a retry.

Reading from sector 33 to sector 36 has still not been completed, and command executing means 4 resets the sectors to be read to sectors 33–36 in Step 212 of FIG. 3.

Command executing means 4 then returns to Step 205 and instructs the reading of sector 33 to sector 36 of track 20 to positioning means 6 and reading/writing means 7.

Since sector 36 of track 20 is an error sector, command executing means 4 reads sectors 33, 34, and 35, following which an error occurs at sector 36 and command executing means 4 terminates reading.

In the judgment of Step 206, command executing means 4 proceeds to Step 207 because the reading process of Step 205 ended in an error.

In Step 207, command executing means 4 refers to the load level counter to decide the content of retry processing in the event of an error.

If it is assumed that two more commands have been received during the series of processes from the time when the number of commands stored in command queue 2 was "2" until the present, the number of commands stored in command queue 2 is a total of "4". The load level value of load level conversion table 10 that corresponds to a command number of "4" is "3", and the value of the load level counter is therefore updated to "3".

Command executing means 4 then refers to retry table 9 using this load level counter value of "3" as the index value.

Command executing means 4 next gives instructions to positioning means 6 and reading/writing means 7 in accordance with the content of retry processing obtained from retry table 9 and executes retry processing (Step 208). Retry processing in this case is terminated after "one simple retry"; i.e., after carrying out only one retry (reading) with respect to error sector 36.

After completing the retry, command executing means 4 judges the results of the retry process (Step 209), and if it is determined that the retry was successful, determines whether or not there remain sectors for which reading or writing is to be continued (Step 211). Because reading has been completed for all sectors in this case, command executing means 4 returns to Step 201 of FIG. 3 and moves on to operations for fetching the next command.

If command executing means 4 determines in Step 209 that the retry failed and the error could not be recovered, command executing means 4 reports to the host computer that the execution of the command was terminated by an error (Step 210), returns to Step 201, and moves onto the sequence of fetching the next command.

The processing of Step 201 to Step 212 in FIG. 3 is carried out continuously until no commands remain in command queue 2.

Explanation is next presented regarding the merits of the magnetic disk device of this embodiment.

In this embodiment, the number of commands stored in command queue 2 is taken as the load level of the interface with the host computer.

Interface load levels and the contents of, retry processing are stored in retry table 9 with a correspondence such that retry processing is heavy when the interface load is light (the processing time is lengthy with many retries before termination) and light when the interface load is heavy (the processing time is short with few retries before termination).

The magnetic disk device can reduce the amount of time spent for retries when the interface load level is heavy because command executing means 4 refers to retry table 9 when retry is necessary. Interruptions in data transfer that might cause interruptions or disruption of an active images can therefore be prevented.

In this embodiment, moreover, each time an error occurs and retry becomes necessary, a load level counter that indicates the interface load level is consulted, following which retry table 9 is consulted and the content of retry processing is changed. As a result, the magnetic disk device can reduce the amount of time spent in retries even in a case in which the execution of one command encounters errors in sectors in a plurality of locations.

Second Embodiment

Figure 7:
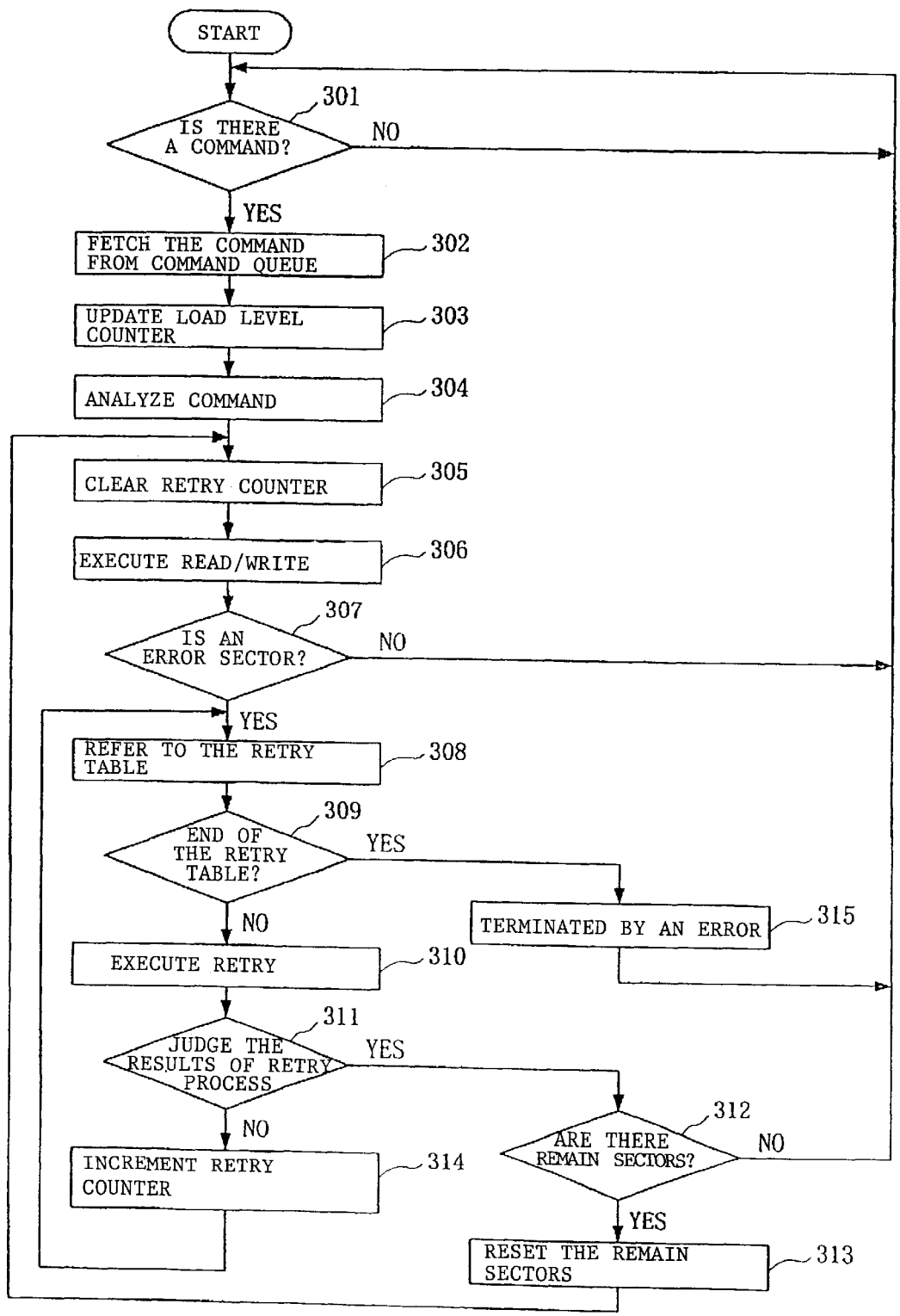
FIG. 7 is a flow chart for explaining the operation of the magnetic disk device according to the second embodiment of the present invention.

The second embodiment of the present invention is next described in detail with reference to the figures. FIG. 7 is a flow chart for explaining the operation of the magnetic disk device that is the second embodiment of the present invention.

In this embodiment as well, the construction of the magnetic disk device is substantially the same as that of the first embodiment, and the operation of the magnetic disk device of this embodiment is explained using FIG. 1, FIG. 2, FIGS. 4–6, and FIG. 7.

First, when a command is sent from a host computer (not shown in the figures) to interface control means 1, interface control means 1 detects that a command has been sent in (Step 101 in FIG. 2), and begins a command receiving process (Step 102). Interface control means 1 then stores the received command in command queue 2 (Step 103).

Upon detecting that a command has been stored in command queue 2 by interface control means 1, interface load detecting means 3 refers to load level conversion table 10 using the number of commands stored in command queue 2 as the index value and obtains a load level value that corresponds to this number of commands. Interface load detecting means 3 then updates its own load level counter (not shown in the figures) using the obtained load level value (Step 104).

The value of the load level counter is set to "0" at the time of initialization. When updating of the load level counter is completed, the process returns to Step 101 and interface control means 1 and interface load detecting means 3 move to a standby state for receiving commands from the host computer.

The above-described sequence is activated each time a command is sent from the host computer, whereby the operations of adding the command to command queue 2 and updating the load level counter are carried out.

The above-described operations are entirely identical to those of the first embodiment.

Upon detecting that a command has been stored in command queue 2 (Step 301 in FIG. 7), command executing means 4 fetches the command from command queue 2 (Step 302).

The number of commands stored in command queue 2 at this time is decreased when the command is fetched from command queue 2. Interface load detecting means 3 therefore refers again to load level conversion table 10 using the number of commands stored in command queue 2 as the index value, obtains a new load level value that corresponds to this number of commands, and updates its own load level counter using this load level value (Step 303).

Next, command executing means 4 analyzes the command that was fetched from command queue 2 (Step 304), and further, initializes its own retry counter (not shown in the figure) to "0" (Step 305).

This retry counter counts the number of retries, and referring to the value of this retry counter can simplify the determination of which retry is being processed. The value of this retry counter is also the offset value that indicates the content of retry processing in retry table 9.

After initializing the retry counter, command executing means 4 gives instructions to positioning means 6 and reading/writing means 7 in accordance with the content of the analyzed command. Accordingly, positioning means 6 positions head 11 at the sectors of medium 5 that are designated by the above-described command, and reading/writing means 7 executes reading or writing with respect to these sectors (Step 306).

Error detecting means 8 detects errors that occur during reading or writing. After executing reading from or writing to medium 5, command executing means 4 checks whether or not the process was terminated by an error based on the detection results of error detecting means 8 (Step 307).

Command executing means 4 then returns to Step 301 if the process ended normally, but if the process was terminated by an error, moves on to step 308 to begin retry processing.

In Step 308, command executing means 4 refers to retry table 9 with the value of the load level counter as the index value and the value of the retry counter as the offset value in order to carry out the first retry.

As in the first embodiment, the content of retry processing that corresponds to the value of the load level counter is described in retry table 9. In addition, the retry processing described in retry table 9 becomes lighter as the corresponding load level counter value increases.

As described hereinabove, command executing means 4 refers to retry table 9 with the value of the load level counter as the index value and the value of the retry counter as the offset value. For example, if the value of the load level counter is "1" and the value of the retry counter is "0", the content of retry processing that is obtained from retry table 9 of FIG. 4 is "3 simple retries"; and when the value of the load level counter is "1" and the value of the retry counter is "1", the content of retry processing is "offset +1".

In other words, in contrast to the first embodiment in which the entire content of retry processing that corresponds to a specific load level counter value is obtained all at once, only one retry of the retry processing is obtained in the present embodiment.

Command executing means 4 next checks the content of retry processing obtained from retry table 9 (Step 309), and proceeds to Step 310 if this is content that is to be executed (i.e., if not information indicating termination of retry processing).

In Step 310, command executing means 4 gives instructions to positioning means 6 and reading/writing means 7 in accordance with the content of retry processing obtained from retry table 9 and executes the retry process.

For example, when the value of the load level counter is "1" and the value of the retry counter is "0", command executing means 4 carries out three retries (reading or writing) with respect to the sector in which an error occurred as the first retry processing.

After executing this retry processing, command executing means 4 judges the results of carrying out the retry process (Step 311). If command executing means 4 determines that an error occurred and the retry failed based on the detection results of error detecting means 8, it increases the value of the retry counter by "1" (Step 314) and again returns to Step 308 and refers to retry table 9.

If, on the other hand, command executing means 4 determines that the retry was successful, it next determines whether or not there remain sectors for which reading or writing is be performed as designated by the command fetched from command queue 2 (Step 312).

If there are no remaining sectors, command executing means 4 returns to Step 301 and moves on to the sequence of fetching the next command. If there is a remaining sector, command executing means 4 returns to Step 305 to carry out reading or writing with respect to the remaining sector.

If the content obtained from retry table 9 in Step 309 is information indicating termination of the retry processing, command executing means 4 terminates the retry, reports to the host computer that execution of the command has been terminated by an error (Step 315), returns to Step 301, and moves on to the sequence of fetching the next command.

The operations of the magnetic disk device of this embodiment are next described using a more concrete example. As in the first embodiment, it is assumed that error sectors 32 and 36 are present in track 20 shown in FIG. 6 and that no commands are registered in command queue 2 at the time of initialization.

First, when a command is sent from a host computer (not shown in the figure) to interface control means 1, interface control means 1 detects that a command has been sent in (Step 101 of FIG. 2), and begins the command receiving process (Step 102). The command in this case is assumed to instruct reading of data from sector 30 to sector 34 of track 20 in FIG. 6.

Interface control means 1 then stores the received command in command queue 2 (Step 103).

The number of commands stored in command queue 2 at this point is "1", and interface load detecting means 3 therefore refers to load level conversion table 10 of FIG. 5 using the number of commands (1) as the index value and obtains the load level value of "1", whereupon interface load detecting means 3 updates the value of the load level counter to "1" (Step 104). When the command receiving processes of Steps 102–104 have been completed, the process returns to Step 101 in preparation for receiving the next command.

Upon detecting that a command has been stored in command queue 2 (Step 301 in FIG. 7), command executing means 4 fetches the command from command queue 2 (Step 302), and the number of commands stored in command queue 2 therefore becomes "0".

Interface load detecting means 3 consequently refers to load level conversion table 10 using the number of commands "0" as the index value and obtains a load level value of "0". Interface load detecting means 3 then updates the value of the load level counter to "0" (Step 303).

Command executing means 4 next both analyzes the command that was fetched from command queue 2 (Step 304) and initializes its own retry counter to "0" (Step 305).

In accordance with the content of the analyzed command, command executing means 4 next instructs the reading from sector 30 to sector 34 of track 20 to positioning means 6 and reading/writing means 7. In accordance with this instruction, positioning means 6 positions head 11 at track 20 of medium 5 and reading/writing means 7 executes reading from sectors 30–34 (Step 306).

Since sector 32 of track 20 is an error sector, after reading from sectors 30 and 31 has been carried out, an error occurs in sector 32 and the reading is terminated.

In the judgment of Step 307, command executing means 4 proceeds to Step 308 because the reading process of Step 306 has been terminated by an error.

In Step 308, command executing means 4 refers to load level counter to decide the content of retry processing in the event of an error.

If it is assumed that no commands have been received during the series of processes from Step 301 to Step 307, the number of commands stored in command queue 2 remains at "0", and the value of the load level counter is therefore not updated and remains at "0".

If a command is received, however, the load level counter is updated each time the sequence from Step 101 to Step 104 of FIG. 2 is followed.

If it is here assumed that two commands were received during the series of processes from Step 301 to Step 307 described hereinabove, the number of commands stored in command queue 2 becomes "1" with the reception of the first command, and since the load level value of load level conversion table 10 that corresponds to one command is "1", the value of the load level counter is updated to "1". The value of the load level counter is similarly updated to "2" with the reception of the second command.

In Step 308, command executing means 4 refers to retry table 9 using the value of the load level counter as the index value and the value of the retry counter as the offset value.

If it is assumed that two commands were received during the series of processes of Steps 301–307 as described hereinabove, the value of the load level counter is "2", while the value of the retry counter is "0" because not a single retry has yet been carried out.

In retry table 9 of FIG. 4, the content of retry processing that corresponds to a load level counter value of "2" and a retry counter value of "0" is "1 simple retry".

Command executing means 4 next checks the content of retry processing that was obtained from retry table 9 (Step 309), proceeds to Step 310 if this content indicates that a process is to be executed, and proceeds to Step 315 if the content obtained from retry table 9 is information indicating termination of the retry processing.

In this case, the content of retry processing obtained from retry table 9 is "1 simple retry" and the process therefore proceeds to Step 310.

In Step 310, command executing means 4 instructs positioning means 6 and reading/writing means 7 to retry (read) from error sector 32 in accordance with the content of retry processing obtained from retry table 9.

After executing this retry process, command executing means 4 judges the results of carrying out the retry (Step 311). If it determines that an error has occurred and the retry has failed, command executing means 4 then increases the retry counter value by "1" (Step 314). The value of retry counter is then incremented by "1" from "0" to become "1".

The process returns to Step 308 after the value of the retry counter is incremented, but it can be expected that commands have been transmitted from the host computer during the retry process.

If it is assumed that two more commands have been received at this time, the number of commands stored in command queue 2 becomes a total of 4. The load level value of load level conversion table 10 that corresponds to this command number "4" is "3", and the value of the load level counter is therefore updated to "3".

In the retry table 9 of FIG. 4, the content of retry processing that corresponds to a load level counter value of "3" and a retry counter value of "1" is "terminate".

As a result, command executing means 4 determines "YES" in Step 309, terminates the retry, and reports to the host computer that the execution of the command has been terminated by an error (Step 315). Command executing means 4 then returns to Step 301 and moves on to the sequence of fetching the next command.

If a command has not been received from the host computer during the retry process, the value of the load level counter remains at "2" and the value of the retry counter is "1", and the content of retry processing obtained from retry table 9 in Step 308 therefore becomes "offset +1".

Command executing means 4 therefore determines "NO" in Step 309, and after performing an offset seek of one unit of distance carries out one retry of error sector 32.

After executing this retry process, command executing means 4 judges the results of the retry (Step 311). If the retry was successful, command executing means 4 then determines whether or not a sector remains for which reading or writing is to be continued (Step 312).

In this case, reading of sectors 30 and 31 has been completed in accordance with the read command instructing reading from sector 30 to sector 34, and reading of sector 32 has also been completed by the retry.

The reading of sector 33 and sector 34 is still incomplete, and command executing means 4 resets the sectors to be read to sector 33 and sector 34 in Step 313.

Command executing means 4 then returns to Step 305, initializes the retry counter to "0", and instructs positioning means 6 and reading/writing means 7 to read from sector 33 and sector 34 on track 20 (Step 306).

The processes of the above-described Steps 307–311 are similarly executed, and if there is no remaining sector in Step 312, command executing means 4 terminates execution of the command, returns to Step 301, and moves on to the operation of fetching the next command.

The processes of Steps 301–315 in FIG. 7 are carried out continuously until there are no commands in command queue 2.

The merits of the magnetic disk device of this embodiment are next explained.

In this embodiment, the number of commands stored in command queue 2 is considered to be the interface load level.

The interface load levels and the contents of retry processing are stored in retry table 9 with a correspondence such that heavy retry processing is carried out when the interface load is light and light retry processing is carried out when the load is heavy, and command executing means 4 is caused to refer to retry table 9 when retry is necessary. The amount of time spent for retry can therefore be cut when the interface load is heavy, and interruptions in data transfer that cause interruptions or disruptions in an active image can therefore be eliminated.

In this embodiment, moreover, a load level counter that indicates the interface load level is consulted, following which retry table 9 is consulted and the content of retry processing varied each time the same sector is subjected to retry, and as a result, a retry process can be interrupted and the amount of time spent in a retry can be cut when the load level becomes high, even during retry of the same sector.

While preferred embodiments of the present invention have been described using specific terms, such description is for illustrative purposes only, and it is to be understood that changes and variations may be made without departing from the spirit or scope of the following claims.

What is claimed is:

1. A magnetic disk device comprising:
    a driving means that includes a magnetic disk and that drives said magnetic disk;
    a reading/writing means for reading or writing data, that includes error detecting means;
    a positioning means for determining the position of said reading/writing means on said magnetic disk;
    an interface control means for communicating with a host computer;
    a command queue for storing commands received in said interface control means;
    a load detecting means for detecting a load level of the interface control means by determining a total number of commands stored in said command queue and reading a load level corresponding to the total number of commands from a table that associates load levels with numbers of commands stored in said command queue;
    a retry table storing contents of retry processes that correspond to respective load levels; and
    executing means for fetching and executing a command from said command queue, and when retry of said command is necessary, performing said retry in accordance with at least a portion of a retry process corresponding to a load level detected by said load detecting means.

2. A magnetic disk device according to claim 1, wherein said retry table stores said loads and contents of retry processes with a correspondence such that heavy retry processing is performed when said interface load level is light and light retry processing is performed when said interface load level is heavy.

3. A magnetic disk device according to claim 1, wherein said retry is performed in accordance with a retry process corresponding to a load level detected at the time of execution of said command.

4. A retry method of a magnetic disk device comprising the steps of:
    receiving commands from a host computer by an interface control means;
    storing said received commands in a command queue;
    detecting a load level of the interface with said host computer by determining a total number of commands stored in said command queue and reading a load level corresponding to the total number of commands from a table that associates load levels with numbers of commands stored in the command queue; and
    fetching and executing a command from said command queue and, when retry of said command is necessary, performing said retry in accordance with at least a portion of a retry process stored in a retry table in association with the detected load level.

5. A retry method of a magnetic disk device according to claim 4, wherein load levels and contents of retry processes are stored in said retry table with a correspondence such that heavy retry processing is performed when said interface load level is light and light retry processing is performed when said interface load level is heavy.

6. A retry method of a magnetic disk device according to claim 4, wherein said retry is performed in accordance with a retry process corresponding to a load level detected at the time of execution of said command.

7. A magnetic disk device comprising:
    a driving means that includes a magnetic disk and that drives said magnetic disk;
    a reading/writing means for reading or writing data, that includes error detecting means;
    a positioning means for determining the position of said reading/writing means on said magnetic disk;
    an interface control means for communicating with a host computer;
    a command queue for storing commands received in said interface control means;
    a load detecting means for detecting a load level of the interface control means by determining a total number of commands stored in said command queue and reading a load level corresponding to the total number of commands from a table that associates load levels with numbers of commands stored in said command queue;
    a retry table storing contents of retry processes that correspond to said respective load levels; and
    executing means for fetching and executing a command from said command queue, and when retry of said command is necessary, performing said retry in accordance with at least a portion of a retry process corresponding to a load level detected by said load detecting means,
    wherein said executing means refers to said retry table each time a retry of a same sector on a medium is executed and obtains from said retry table a portion of a retry process that corresponds to the load level detected at the time of the retry.

8. A retry method of a magnetic disk device comprising the steps of:
    receiving commands from a host computer by an interface control means;
    storing said received commands in a command queue;
    detecting a load level of the interface with said host computer by determining a total number of commands stored in said command queue and reading a load level corresponding to the total number of commands from a table that associates load levels with numbers of commands stored in the command queue; and
    fetching and executing a command from said command queue and, when retry of said command is necessary, performing said retry using at least a portion of a retry process stored in a retry table in association with a detected load level,
    wherein said retry table is referred to each time a retry of a same sector on a medium is executed to obtain from said retry table a portion of a retry process that corresponds to a load level detected at the time of the retry.

* * * * *